— 
United States Patent [19]
Corbett

[11] 3,939,004
[45] Feb. 17, 1976

[54] ASPHALT PAVING COMPOSITIONS FROM POSITIVE SPOT ASPHALT FRACTIONS

[75] Inventor: Luke W. Corbett, Mountainside, N.J.

[73] Assignee: Exxon Research and Engineering Company, Linden, N.J.

[22] Filed: Nov. 29, 1974

[21] Appl. No.: 528,440

Related U.S. Application Data

[63] Continuation of Ser. No. 222,693, Feb. 1, 1972, abandoned.

[52] U.S. Cl............. 106/273 R; 106/279; 106/280; 106/281 R
[51] Int. Cl.²...................... C08L 95/00; C10C 3/08
[58] Field of Search ........... 106/273, 274, 275, 276, 106/277, 278, 279, 280, 281, 283, 284, 285; 208/22, 23, 44, 45

[56] References Cited
UNITED STATES PATENTS

| | | | |
|---|---|---|---|
| 2,131,205 | 9/1938 | Wells et al. | 208/41 |
| 2,317,150 | 4/1943 | Lovell et al. | 208/23 |
| 2,658,026 | 11/1953 | MacLaren et al. | 208/23 |
| 3,087,887 | 4/1963 | Corbett et al. | 208/23 |
| 3,392,104 | 7/1968 | Potts et al. | 208/23 X |
| 3,563,778 | 2/1971 | Corbett et al. | 208/23 X |
| 3,793,189 | 2/1974 | Corbett | 208/23 |
| 3,832,200 | 8/1974 | Kennel et al. | 106/281 R |

OTHER PUBLICATIONS

Abraham, Asphalts and Allied Substances, Sixth Ed., Vol. 2, N.Y., D. Van Nostrand Co., Inc., TN 853 A35 1960, C2, pp. 198–203.
Barth, Asphalt, N.Y., Gordon and Breach Science Publishers, 1962, TN 853 B3 C3, pp. 430–450.
Corbett, "Analytical Chemistry," Vol. 41, pp. 576–579, Apr., 1969.

*Primary Examiner*—Joan E. Welcome
*Attorney, Agent, or Firm*—Byron O. Dimmick

[57] ABSTRACT

Asphalt fractions unsuitable for use in paving formulations because of their inhomogeneity (as reflected by their inability to pass the Oliensis Spot Test) can be used to make homogeneous asphaltic compositions (which pass the Oliensis Spot Test) by combining them with a propane precipitated asphalt and/or petrolene fraction. The latter fractions must have a polar aromatic content of at least 20%. Optionally up to 10% vacuum gas oil can also be added to the compositions. These upgraded asphaltic compositions have a polar aromatic content of at least 30% and are useful in paving formulations.

4 Claims, No Drawings

ASPHALT PAVING COMPOSITIONS FROM POSITIVE SPOT ASPHALT FRACTIONS

This is a continuation of application Ser. No. 222,693, filed Feb. 1, 1972, now abandoned.

BACKGROUND OF THE INVENTION

1. Field of the Invention

This invention relates to the preparation of asphaltic compositions useful for making paving formulations. These compositions are made by combining certain asphalt fractions, such as asphaltenes and/or residual pitches (which were heretofore thought to be unsuitable for making paving formulations), with propane precipitated asphalt and/or petrolene fractions. The latter components, which must have a polar content of at least 20%, render the total composition sufficiently homogeneous to be useful in paving formulations.

2. Description of the Prior Art

It is well known that certain asphalt fractions cannot be used for formulation of paving binders because of their inhomogeneity as reflected by a positive response to the Oliensis Spot Test (AASHO Test Designation T-102-57). Such fractions are called "positive spot" asphalt fractions and have usually been diverted into relatively uneconomical uses such as for fuel.

It has been known in the prior art that asphalts suitable for use in paving formulations can be prepared by various techniques such as (a) blending residua from two or more crude sources, (b) reconstituting an asphalt from its components (see, e.g., British Specification No. 465,288) or (c) air-blowing asphaltic fractions containing synthetic polymers (see, e.g., U.S. Pat. No. 3,540,906). Still, the need for efficient, economical techniques for allowing the use of positive spot asphalt fractions in paving formulations has not been fully met.

It is an advantage of the present invention that positive spot asphalt fractions, which of themselves have little value beyond their value as fuels, can be included in compositions suitable for use in paving formulations.

SUMMARY OF THE INVENTION

It has been found that asphaltic compositions of paving binder quality and sufficient homogeneity to pass the Oliensis Spot Test can be made by combining a positive spot asphalt fraction, such as asphaltenes or visbreaker pitch, with propane precipitated asphalt and/or nonvolatile petrolene fractions having polar aromatic contents of at least 20%. (In this application all percentages and parts are by weight unless otherwise noted). The compositions produced have polar aromatic contents of at least about 30%. Optionally, up to 10% vacuum gas oil can also be included in the compositions. These compositions exhibit a number of properties which make them suitable for use in paving formulations.

DETAILED DESCRIPTION OF THE INVENTION

The positive spot asphaltene fractions used in this invention can be the product of straight distillative reduction of crude oil followed by precipitation with an aliphatic hydrocarbon precipitant. Such asphaltene fractions contain substantially no petrolene (aliphatic hydrocarbon soluble) fraction. Preferred asphaltene fractions for use in this invention are those precipitated from a residuum by aliphatic hydrocarbons having 5 to 9 carbon atoms. A still more preferred fraction is that precipitated with at least 3 volumes of heptane per volume of residuum and known as heptane precipitated asphaltenes.

Techniques for the production of such asphaltene fractions are well known in the art. For example, U.S. Pat. No. 3,087,887 and 3,093,573 as well as British Pat. No. 465,288 all disclose such techniques.

Another source of positive spot asphalt fractions is from refinery operations such as visbreaking. Visbreaking is a well known mild thermal cracking process used to reduce the viscosity of residua going into fuel oil. Generally, this process produces a solid pitch fraction as well as liquid products. Although visbreaker pitches are available in abundant quantity from visbreaking operations, it has been found that generally they are inhomogeneous and, therefore, fail the Oliensis Spot Test. Thus, they are positive spot asphalt fractions and can be used in this invention.

In general, the positive spot asphalt fractions used in this invention, whatever their source, have the following properties:

TABLE I
PROPERTIES OF POSITIVE SPOT ASPHALT FRACTIONS

| | ASTM Method | Operable | Preferred |
|---|---|---|---|
| Furol Vis. at 275°F, sec. | E-102-68 | 20 to 600 | 50 to 300 |
| Flash Point, °F | D-92-57 | 400 to 700 | 450 to 600 |
| Sp. Gravity at 60°F | API | 0.9 to 1.3 | 1.0 to 1.2 |
| Softening Point, °F | D-36-70 | 80 to 300 | 100 to 200 |
| Penetration at 77°F, dmm[1] | D-5-65 | 0 to 300 | 10 to 100 |
| Oliensis Spot Test | AASHO T-102-57 | Positive | Positive |

[1]dmm=decimillimeters=0.1 mm=1/10 mm=mm/10

According to this invention, the above-described positive spot asphalt fractions are combined with a propane precipitated asphalt and/or a nonvolatile petrolene fraction.

As noted above, the fractionation of asphaltic residua by precipitation with aliphatic hydrocarbons is well known in the art. The production of propane precipitated asphalts by using propane as a precipitant is also well known in the art. Such processes are also known as propane deasphalting processes.

Propane precipitated asphalts are relatively aromatic, of relatively high molecular weight and essentially nonvolatile. Propane precipitated asphalts used in this invention have the following properties:

TABLE II
PROPERTIES OF PROPANE PRECIPITATED ASPHALTS

| | Operable | Preferred |
|---|---|---|
| Softening Point, °F | 150 to 225 | 175 to 215 |
| Penetration at 77°F, dmm | 0 to 15 | 0 to 10 |

TABLE II-continued

PROPERTIES OF
PROPANE PRECIPITATED ASPHALTS

|  | Operable | Preferred |
|---|---|---|
| Polar Aromatic Content, wt.% | ≥20 | ≥20 |

Petrolene fractions are generally found dissolved in aliphatic precipitants after they have been used in the above-noted asphalt fractionating processes. Generally they are recovered by evaporation of the precipitant. A preferred petrolene fraction for use in this invention is that obtained from propane precipitation or deasphalting. The petrolene fractions used in this invention have the following properties:

TABLE III

PROPERTIES OF PETROLENE FRACTIONS

| | ASTM Method | Operable | Preferred |
|---|---|---|---|
| Initial boiling point, °F[1] | D-1160-61 | >900 | >1,200 |
| SUS Viscosity at 210°F | D-88-56 | 20 to 800 | 50 to 400 |
| Flash Point, °F | D-92-57 | >400 | ≥400 |
| Pour Point, °F | D-97-57 | −10 to 120 | −10 to 50 |
| Polar Aromatic Content, wt.% | See below | ≥20 | ≥20 |

[1]Atmosphere equivalent vapor temperatures

It will be noted that both the compositions of this invention and some of their constituents are characterized by their polar aromatic contents. This polar aromatic content can be measured by the method described in *Analytical Chemistry*, 41, 576 (1969). Briefly, this method consists of first removing any asphaltenes from a sample by precipitation with heptane (100 ml/gm of sample) and then chromatographically analyzing the extract on activated alumina. After elution of the saturated and naphthene-aromatic fractions with aliphatic and aromatic solvents, the polar aromatic fraction is eluted with trichloroethylene and weighed.

Optionally, the compositions of this invention can contain vacuum gas oil. For the purposes of this invention, vacuum gas oil can be defined as a petroleum distillate having an atmospheric equivalent boiling range of about 650° to 1,100°F, preferably about 700° to 1,000°F, most preferably about 800° to 900°F as determined by ASTM D-1160-61. When such petroleum distillates are used in this invention, they constitute up to 10% of the total composition, preferably, less than 10%.

Techniques for combining the above-described components to produce the compositions of this invention are well known in the art. A particular technique which can be used is the refluxing process disclosed in the above-noted U.S. Pat. No. 3,087,887. Other methods include hot fluxing in a mixing vessel, storage tank or transport vessel and inline blending of two or more components using proportioning flow regulators.

Preferably, when visbreaker pitch is used in the compositions of this invention, it constitutes about 10 to 60%, more preferably 20 to 50%, most preferably 30 to 40% of the composition.

Preferably, when an asphaltene fraction is used in the compositions of this invention, it constitutes about 5 to 45%, more preferably 10 to 40%, most preferably 20 to 40% of the composition.

In some embodiments of this invention, a positive spot fraction and only one other component, either propane precipitated asphalt or nonvolatile petrolenes, are used. In other embodiments, a positive spot fraction and both a propane precipitated asphalt and a petrolene fraction are used. In still other embodiments, a positive spot fraction, one or more of the other above-mentioned fractions and vacuum gas oil are used.

In addition to passing the Oliensis Spot Test, the compositions of this invention exhibit viscosity and temperature susceptibility properties which are at least as good as and often better than those exhibited by prior art, straight reduced asphalts which are used in paving formulations. They also exhibit minimal properties which make an asphaltic composition suitable for use in paving formulations. Illustrative of some of these properties are the following:

TABLE IV

MINIMAL PROPERTIES OF
ASPHALTS SUITABLE FOR PAVING FORMULATIONS

| Absolute Viscosity, at 140°F, poises[1] | D-2171 | 1000 |
|---|---|---|
| Ductility, cm. | D-113 | 50 |
| Penetration Ratio, (39.2°F/77°F)[1] | D-5 | 0.25 |
| Kin. Vis. at 275°F, cSt.[1] | D-217 | 290 |
| Oliensis Spot Test | AASHO T-102-57 | Negative |

[1]Interpolated to 90 dmm penetration at 77°F

The interpolation referred to in Table IV is carried out by measuring both the specified property and the composition's penetration at 77°F. Then the concentration of a component of the composition is varied in an insignificant amount (1 to 5%) so as to change the composition's penetration. If the penetration is originally above 90 dmm, the composition is varied so as to produce a penetration below 90 dmm; the opposite procedure is performed if the penetration is originally below 90 dmm. The specified property then is remeasured and the penetrations of the two samples plotted against the logarithm of the specified property (e.g., viscosity). The property's value up to 90 dmm can then be determined by interpolation. Further details of this method, which allows comparison of properties of various samples at a common penetration level, can be found in Proc. Assoc. Aup. Pav. Tech., 39, 443 (1970).

Preferably and most preferably, the compositions of this invention exhibit the following minimal properties:

TABLE V

PREFERRED MINIMAL PROPERTIES OF ASPHALT COMPOSITIONS PRODUCED BY THE PROCESS OF THIS INVENTION

| | Preferred | Most Preferred |
|---|---|---|
| Absolute Viscosity at 140°F, poises[1] | 1500 | 2000 |
| Ductility, cm. | 75 | 100 |
| Penetration Ratio, 39.2°F/77°F[1] | 0.30 | 0.35 |
| Polar Aromatic Content, % | 30 | 30 |
| Kinetic Viscosity at 275°F, cSt.[1] | 325 | 390 |

[1]Interpolated to 90 dmm penetration at 77°F

Higher kinetic viscosities at 275°F are an indication of better asphalt quality. Although asphalt compositions with lower viscosities are used in the art, adjustments in mixing and placement temperatures are necessary. Such adjustments are disadvantageous in field operations.

High penetration ratios reflect low temperature susceptibilities which are desirable because they make handling of the asphaltic compositions in the field more consistent with uniform practices, especially during the preparation of asphalt-aggregate mixtures.

DESCRIPTION OF SPECIFIC EMBODIMENTS

This invention can be more fully understood by reference to the following examples. These are offered by way of illustration only and are in no way intended to limit the scope of the invention.

The first two examples illustrate the use of a visbreaker pitch (derived from Tia Juana medium crude oil and exhibiting a positive Oliensis Spot Test) in asphaltic compositions exhibiting negative Oliensis Spot Tests.

EXAMPLE 1

Thirty-nine parts of visbreaker pitch (penetration at 77°F = 54 dmm) was blended with 39 parts of a propane precipitated asphalt (softening point = 212°F. and polar aromatic content = 53%) and 22 parts of vacuum gas oil boiling in the range from 850° to 950°F (atmospheric equivalent vapor temperature). The blended composition had a polar aromatic content of 38% and exhibited a negative Oliensis Spot Test. Other properties of this composition, interpolated to 90 dmm penetration, are included in Table VI below.

EXAMPLE 2

The visbreaker pitch of Example 1 (51 parts) was blended with 49 parts of nonvolatile petrolenes (softening point = 98°F, polar aromatic content 46%, penetration at 77°F= 125 dmm and viscosity at 275°F = 163 cSt.) obtained from a refinery propane deasphalting unit. The resultant composition was negative to the Oliensis Spot Test and had a polar aromatic content of 42%. Other properties of this composition, interpolated to 90 dmm penetration, are included in Table VI.

CONTROL A

To illustrate the superiority of mixtures made by the process of this invention over those known in the prior art, 83 parts of the visbreaker pitch used in Example 1 was blended with 17 parts of a straight reduced residuum from Tia Juana crude oil (viscosity at 122°F = 3000 SFS, polar aromatic content = 17%, and specific gravity at 60°F = 0.980). This blend is termed Control A and its properties are included in Table VI.

TABLE VI

| | Examples 1 | 2 | Control A |
|---|---|---|---|
| Pen Ratio (39.2°/77°)[1] | 0.41 | 0.35 | 0.36 |
| Ab. Vis at 140°F, p.[1] | 2075 | 2025 | 1610 |
| Kin Vis at 275°F, cSt[1] | 352 | 404 | 342 |
| Oliensis Spot Test | Neg | Neg | Pos |
| Polar Aromatic Content, % | 38 | 42 | — |

[1]Interpolated to 90 dmm penetration.

As can be seen from inspection of the data in Table VI, Control A exhibited a positive Oliensis Spot Test and an absolute viscosity substantially lower than those of Examples 1 and 2. This result demonstrates that to obtain a negative spot paving composition, it is necessary that the petroleum fraction have a polar aromatic content of at least 20%. The data also show that the compositions made according to this invention exhibit viscosity and penetration properties that are well above the minimal properties noted above for paving grade asphaltic compositions.

Examples 3 and 4 illustrate embodiments of this invention in which positive spot heptane precipitated asphaltenes are used to make negative spot asphaltic compositions.

EXAMPLE 3

Fifty-seven parts of propane precipated asphalt (softening point = 218°F and polar aromatic content = 54%), derived from Tia Juana medium crude, was blended with 8 parts of vacuum gas oil having a boiling range of 850° to 950°F (atmospheric equivalent vapor temperature) and 35 parts of heptane precipitated asphaltenes exhibiting a positive Oliensis Spot Test. The heptane precipitated asphaltenes were obtained by contacting a straight run asphalt (penetration at 77°F = 54 dmm), produced from Tia Juana crude oil, with 5 volumes of heptane per volume of asphalt and then recovering the precipitated asphaltenes by filtration. The blend exhibited a penetration at 77°F of 52 dmm, a 39.2°F to 77°F penetration ratio of 0.40, a polar aromatic content of 36% and a negative Oliensis Spot Test.

EXAMPLE 4

The propane precipitated asphalt of Example 3 (54 parts) was blended with 8 parts of vacuum gas oil having a boiling range of 900° to 950°F (atmospheric equivalent temperatures) and 38 parts of positive spot heptane precipitated asphaltenes produced by the same technique used in Example 3 from a straight run asphalt (penetration = 90 dmm) derived from Tia Juana crude oil. The blend exhibited a penetration at 77°F of 75 dmm, a polar aromatic content of 39% and a negative Oliensis Spot Test.

Examples 3 and 4 show that heptane precipitated asphaltenes exhibiting a positive Oliensis Spot Test can, through the practice of this invention, be used in compositions exhibiting a negative Oliensis Spot Test.

It is not intended that the scope of this invention be limited to the specific examples presented above by way of illustration. The scope of the invention is limited only by the appended claims.

What is claimed is:

1. An asphalt composition suitable for use in a paving formulation, which comprises a mixture of
   a. an asphaltene fraction having substantially no petrolene content,
   b. propane-precipitated asphalt having a softening point of 150° to 225°F., a penetration at 77°F. of 0 to 15 dmm, and polar aromatic content of at least 20 percent by weight, and
   c. vacuum gas oil having an atmospheric equivalent boiling range within the limits of about 650°F. and 1150°F.

said composition having a polar aromatic content of at least 30 percent by weight, a ductility (ASTM D-113) of at least 50 cm, and a 39.2°F. penetration ratio of at least about 0.25, said composition having a negative Oliensis Spot Test, said asphaltene fraction constituting about 5 to 45 wt. % of the composition, and said vacuum gas oil constituting no more than 10 wt. % of the composition.

2. The composition of claim 1 wherein said composition has an absolute viscosity at 140°F of greater than about 1000 poises and a kinetic viscosity at 275°F of greater than about 290 cSt. when both values are interpolated to the 90 decimillimeter penetration level.

3. The composition of claim 1 wherein said asphaltene fraction has been obtained by precipitation from an asphaltic residuum with an aliphatic hydrocarbon of from 5 to 9 carbon atoms.

4. The composition of claim 1 wherein said asphaltene fraction comprises heptane precipitated asphaltenes.

* * * * *